(12) United States Patent
Quigley et al.

(10) Patent No.: US 6,588,280 B1
(45) Date of Patent: Jul. 8, 2003

(54) PRESSURE TRANSDUCER WITH COMPENSATION FOR THERMAL TRANSIENTS

(75) Inventors: Claudia J. Quigley, Lexington, MA (US); Santhi E. Mathew, Londonderry, MA (US); Leonid Mindlin, South Natick, MA (US); James M. Poulin, Derry, NH (US)

(73) Assignee: MKS Instruments, Inc., Andover, MA (US)

( * ) Notice: Subject to any disclaimer, the term of this patent is extended or adjusted under 35 U.S.C. 154(b) by 0 days.

(21) Appl. No.: 10/127,630
(22) Filed: Apr. 22, 2002
(51) Int. Cl.⁷ .................................................. G01L 7/00
(52) U.S. Cl. ........................................................ 73/708
(58) Field of Search .......................... 73/708, 718, 724, 73/753; 361/283.1, 283.2, 283.3, 283.4

(56) References Cited

U.S. PATENT DOCUMENTS

| | | | |
|---|---|---|---|
| 4,464,725 A | * 8/1984 | Briefer | 702/101 |
| 4,598,381 A | * 7/1986 | Cucci | 702/138 |
| 4,807,477 A | * 2/1989 | Myers et al. | 73/708 |
| 5,291,534 A | * 3/1994 | Sakurai et al. | 377/20 |
| 5,808,206 A | * 9/1998 | Pandorf et al. | 73/756 |

* cited by examiner

Primary Examiner—William Oen
(74) Attorney, Agent, or Firm—Hale and Dorr LLP

(57) ABSTRACT

A method is disclosed for providing transient temperature compensation in a pressure transducer. The transducer includes a capacitive pressure sensor, the pressure sensor including a diaphragm, at least part of the diaphragm moving in response to changes in a pressure. The transducer may further include an electronic circuit which generates an uncompensated output signal representative of the pressure. The disclosed method generates a compensated output signal according to a function of the uncompensated output signal and a difference between a temperature of the pressure sensor and a temperature of the ambient environment.

9 Claims, 5 Drawing Sheets

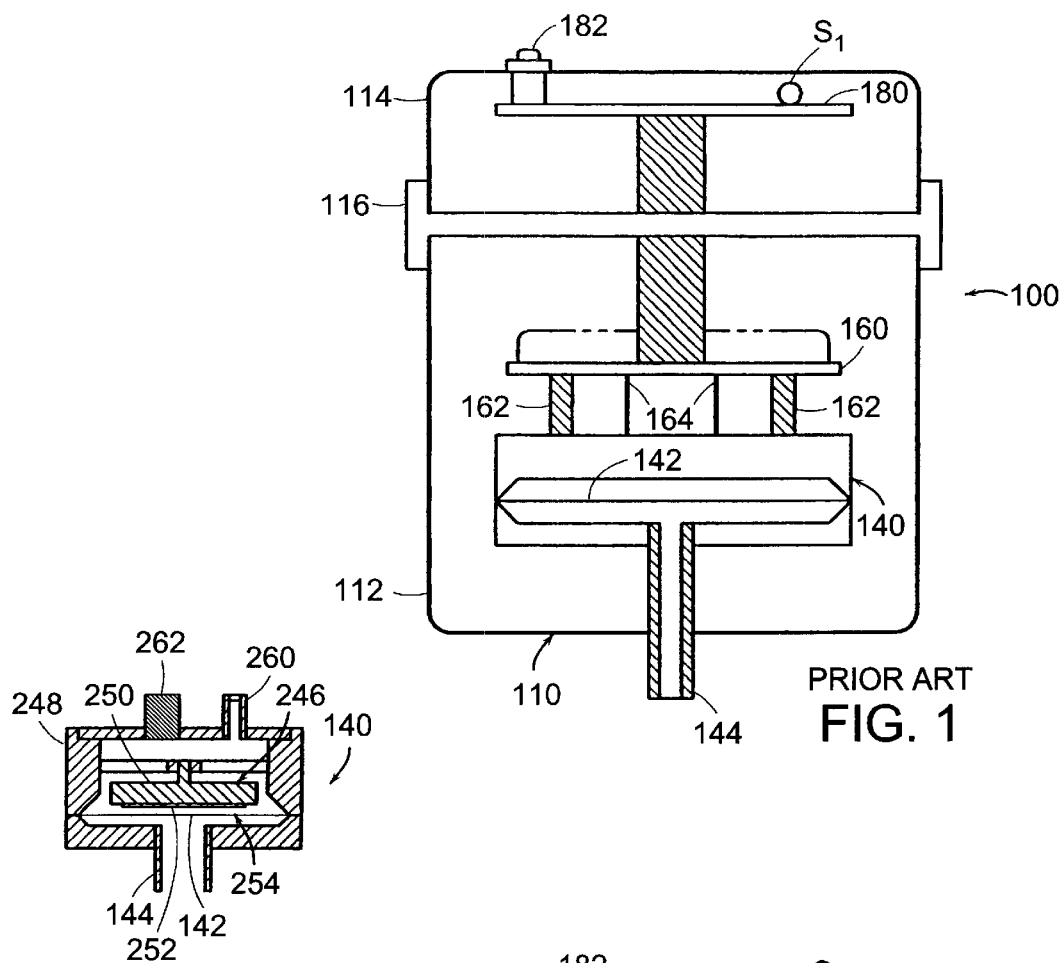
PRIOR ART
FIG. 1
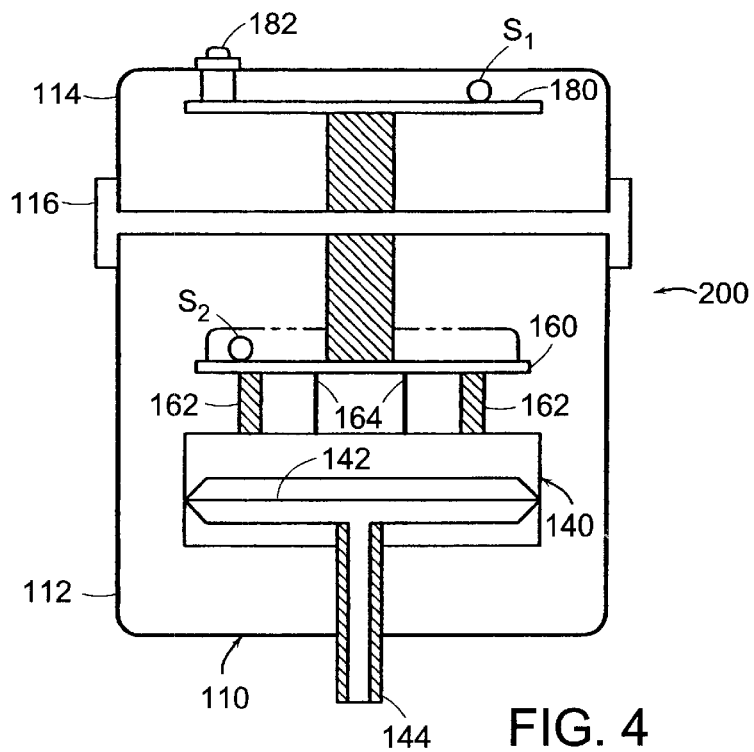
PRIOR ART
FIG. 2
FIG. 4

PRESSURE TRANSDUCER WITH COMPENSATION FOR THERMAL TRANSIENTS

BACKGROUND OF THE INVENTION

The present invention relates to pressure transducers. More specifically, the present invention relates to pressure transducers with compensation for thermal transients.

FIG. 1 shows a sectional view of a prior art unheated capacitive pressure transducer 100. Transducer 100 includes several major components such as an external shell 110, a capacitive pressure sensor 140, a front end electronics assembly 160, and an input/output (I/O) electronics assembly 180. In operation, transducer 100 generates an output signal indicative of a pressure measured by sensor 140.

For convenience of illustration, many mechanical details of transducer 100, such as the construction of sensor 140 and the mounting of sensor 140 and electronics assemblies 160, 180, have been omitted from FIG. 1. However, capacitive pressure transducers such as transducer 100 are well known and are described for example in U.S. Pat. Nos. 5,625,152 (Pandorf); 5,911,162 (Denner); and 6,029,525 (Grudzien).

Briefly, external shell 110 includes a lower enclosure 112, an upper electronics enclosure 114, and a joiner 116 that holds enclosures 112, 114 together. Sensor 140 and front end electronics assembly 160 are disposed in the space defined by lower enclosure 112 and joiner 116. Mounting posts 162 support front end electronics assembly 160 over sensor 140 and wires 164 electrically connect front end electronics assembly 160 and sensor 140. The I/O electronics assembly 180 is disposed in the space defined by upper electronics enclosure 114 and joiner 116 and is electrically connected to front end electronics assembly 160.

Sensor 140 includes a metallic, flexible, diaphragm 142 and a pressure, or inlet, tube 144. Tube 144 extends from an area proximal to the diaphragm through the lower sensor enclosure 112. The lower, or external, end of tube 144 is generally coupled to a source of fluid (not shown). Pressure of fluid in the source is communicated via tube 144 to the lower surface of diaphragm 142 and the diaphragm 142 flexes up or down in response to changes in pressure within tube 144. Diaphragm 142 and a reference conductive plate of sensor 140 form a capacitor, and the capacitance of that capacitor varies in accordance with movement or flexion of the diaphragm. Accordingly, that capacitance is indicative of the pressure within tube 144. Front end electronics assembly 160 and I/O electronics assembly 180 cooperatively generate an output signal representative of the capacitance of sensor 140 which is, of course, also representative of the pressure within tube 144. I/O electronics assembly 180 makes that output signal available to the environment external to transducer 100 via an electronic connector 182.

FIG. 2 shows one example of how a capacitive pressure sensor 140 can be constructed. Capacitive pressure sensors of the type shown in FIG. 2 are discussed in greater detail in U.S. Pat. No. 6,029,525 (Grudzien). The sensor 140 shown in FIG. 2 includes a circular, conductive, metallic, flexible diaphragm 142, a pressure tube 144, and an electrode 246. Electrode 246 and diaphragm 142 are mounted within a housing 248. Electrode 246 includes a ceramic block 250 and a conductive plate 252. The ceramic block 250 is rigidly mounted to the housing 248 so that a bottom face of block 250 is generally parallel to, and spaced apart from, the diaphragm. The bottom face of block 250 is normally planar and circular. The conductive plate 252 is deposited onto the bottom face of block 250 and is also generally parallel to, and spaced apart from, the diaphragm. Conductive plate 252 and diaphragm 142 form two plates of a variable capacitor 254. The capacitance of capacitor 254 is determined in part by the gap, or spacing, between the diaphragm 142 and the conductive plate 252. Since the diaphragm flexes up and down (thereby changing the spacing between diaphragm 142 and conductive plate 252) in response to pressure changes in tube 144, the capacitance of capacitor 254 is indicative of the pressure within tube 144.

FIG. 2 shows only one of the many known ways of configuring a capacitive pressure sensor 140. However, capacitive pressure sensors 140 generally include one or more conductors that are held in spaced relation to a flexible, conductive, diaphragm. The diaphragm and the conductors form plates of one or more variable capacitors and the capacitance of those capacitors varies according to a function of the pressure in tube 144.

Capacitive pressure sensors often include additional features such as a tube 260 and a getter 262 as shown in FIG. 2. When sensor 140 is being constructed, tube 260 is initially open and is used to establish a reference pressure (e.g., vacuum) in the portion of housing 248 above diaphragm 142. Once the desired reference pressure is established (e.g., by attaching a vacuum pump to tube 260), the upper portion of tube 260 is closed, or "pinched off", so as to maintain the desired reference pressure inside the upper portion of housing 248. Getter 262 is often included to absorb gas molecules that get into the upper portion of housing 248 after tube 260 has been pinched off (e.g., via outgasing of electrode 250).

Returning to FIG. 1, in operation, front end electronics assembly 160 measures the capacitance (or capacitances) of sensor 140 and generates a voltage signal representative of the pressure in inlet tube 144 (e.g., the voltage signal may vary linearly with changes in pressure). I/O electronics assembly 180 typically amplifies and further conditions that voltage signal to generate the output signal of transducer 100.

As shown, the distance between I/O electronics assembly 180 and sensor 140 is greater than the distance between front end electronics assembly 160 and sensor 140. The front end electronics assembly 160 is mounted close to sensor 140 so as to reduce the length of the wires 164. Reducing the length of wires 164 reduces the capacitance of those wires and in effect reduces a stray capacitance associated with the capacitance of sensor 140 and thereby improves the accuracy of transducer 100. I/O electronics assembly 180 is normally separated from sensor 140 by a greater distance so that heat generated by assembly 180 does not adversely affect operation of sensor 140.

Ideally, the output signal of transducer 100 varies only in response to changes in the pressure of the fluid in tube 144. However, changes in temperature of the ambient environment can also affect the output signal. This is primarily due to the different coefficients of thermal expansion of different materials used to construct the sensor 140. Many transducers incorporate heaters and heater shells to provide a controlled thermal environment for the pressure sensor and thereby minimize the affect of changes in the ambient temperature. However, unheated transducers such as transducer 100 also often provide mechanisms for compensating for temperature changes in the ambient environment.

Transducer 100 includes a temperature sensor $S_1$, which is mounted on the I/O electronics assembly 180. In operation, temperature sensor $S_1$ generates an output signal $T_{S1}$, which is representative of the temperature of sensor $S_1$. The sensor $S_1$ is positioned so that its temperature (and its output signal $T_{S1}$) is representative of the temperature of the ambient environment of transducer 100. In operation, transducer 100 uses the temperature sensor $S_1$ to provide compensation for ambient temperature changes. To provide this temperature compensation, I/O electronics assembly 180 generates the output signal of the transducer 100 according to the following Equation (1).

$$O_T = O_U + f_1(T_{S1}) \tag{1}$$

In Equation (1), $O_T$ is the output signal of transducer 100 (a voltage representative of the pressure of the fluid in tube 144); $O_U$ is an internal signal generated within transducer 100 that is representative of the pressure in tube 144; and $f_1(T_{S1})$ is a function of the ambient temperature as measured by temperature sensor $S_1$. $O_U$ may be called the "uncompensated output signal" because it has not yet been compensated for temperature changes. $O_U$ may be the output signal generated by front end electronics assembly 160, or alternatively it may be an internal signal generated by I/O electronics assembly 180 (e.g., it may represent the output signal generated by front end electronics assembly 160 after amplification or linearization by I/O electronics 180 but prior to application of some other form of compensation). The function $f_1(T_{S1})$ is given by the following Equation (2).

$$f_1(T_{S1}) = C_1(T_{S1} - T_{S1Ref}) \tag{2}$$

In Equation (2), $T_{S1}$ is the output signal generated by temperature sensor $S_1$, and the terms $C_1$ and $T_{S1Ref}$ are constant value parameters, the values of which are determined by a calibration procedure. In the calibration procedure, a reference pressure of zero, or a vacuum, is applied to the inlet tube 144. Ideally, the uncompensated output signal $O_U$ is zero volts whenever a vacuum is applied to inlet tube 144. However, due to the temperature sensitive performance of pressure sensor 140, the uncompensated output signal $O_U$ normally varies with changes in ambient temperature. $T_{S1Ref}$ is selected by first determining the ambient temperature at which the uncompensated output signal $O_U$ actually does equal zero volts when a vacuum is applied to the pressure inlet tube, and by then setting $T_{S1Ref}$ equal to the value of the output signal $T_{S1}$ generated by sensor $S_1$ at that temperature.

FIG. 3 illustrates the procedure used for determining the value of the constant $C_1$. As shown in FIG. 3, transducer 100 is operated at a first ambient temperature $T_{A1}$ until a time $T_2$. Between times $T_2$ and $T_3$ heat is added to the ambient environment of transducer 100 until the ambient temperature has risen to a new value $T_{A2}$. At times $T_1$ and $T_4$ measurements are made of the uncompensated output signal $O_U$ while a vacuum reference pressure is applied to the inlet tube 144. $T_1$ is selected to be a time after which transducer 100 has been operating sufficiently long at the first ambient temperature $T_{A1}$ such that the transducer 100 has reached a steady state. Similarly, time $T_4$ is selected to be a time after which transducer 100 has been operating sufficiently long at the second ambient temperature $T_{A2}$ such that the transducer 100 has reached a steady state at the new temperature $T_{A2}$. Using the measurements of the uncompensated output signal $O_U$ made at times $T_1$ and $T_4$, the value of the constant $C_1$ is calculated according to the following Equation (3).

$$C_1 = \frac{[O_U(T_4) - O_U(T_1)]}{(T_{A2} - T_{A1})} \tag{3}$$

In Equation (3), the term $O_U(T_1)$ is the value of the uncompensated output signal $O_U$ at time $T_1$ (or the steady state value of the uncompensated output signal $O_U$ at the first ambient temperature $T_{A1}$). Similarly, the term $O_U(T_4)$ is the value of the uncompensated output signal $O_U$ at time $T_4$ (or the steady state value of the signal $O_U$ at the second ambient temperature $T_{A2}$).

The values of the parameters $C_1$ and $T_{S1Ref}$ measured by the above described calibration procedure are typically unique for every transducer and normally depend on minor variations or tolerances in the manufacture of each transducer. So, for example, two seemingly identical units of transducer 100 may have very different values for the parameters $C_1$ and $T_{S1Ref}$. Accordingly, measurement of these parameters for each transducer is part of the normal manufacturing process for transducer 100.

I/O electronics assembly 180 normally includes read only memory (ROM) for digitally storing the values of the parameters $C_1$ and $T_{S1Ref}$ within transducer 100. I/O electronics assembly 180 also normally includes a digital processor for computing Equation (1) and generating a digital output representative of the transducer's output signal $O_T$. I/O electronics assembly 180 may further include a digital-to-analog converter for generating an analog output signal $O_T$.

Although the above described method compensates the transducer's output signal to some extent for changes in ambient temperature, it would still be advantageous to develop improved methods and structures for providing improved temperature compensation.

SUMMARY OF THE INVENTION

These and other objects are provided by an improved method of providing temperature compensation in a pressure transducer. Prior art pressure transducers provide compensation for steady state temperature changes in the ambient environment. In addition to providing steady state compensation, pressure transducers constructed according to the invention may also provide compensation for transient temperature changes in the ambient environment. As is known, pressure transducers may provide many forms of compensation (e.g., amplification, linearization over a desired range, steady state temperature compensation). In one aspect, transient temperature compensation of the invention is one additional form of compensation provided by the transducer. The transient temperature compensation may be provided by adding a transient compensation term to an internal signal generated by the transducer, where the internal signal can be, for example, a signal representative of a measured pressure prior to application of any other forms of compensation have been provided, or after one or more forms of other compensation have been provided. The transient compensation term may be generated in a variety of ways and is preferably a function of a difference between a temperature of the pressure sensor and a temperature of the ambient environment.

Still other objects and advantages of the present invention will become readily apparent to those skilled in the art from the following detailed description wherein several embodiments are shown and described, simply by way of illustration of the best mode of the invention. As will be realized, the invention is capable of other and different embodiments, and its several details are capable of modifications in various respects, all without departing from the invention. Accordingly, the drawings and description are to be regarded as illustrative in nature, and not in a restrictive or limiting sense, with the scope of the application being indicated in the claims.

BRIEF DESCRIPTION OF THE FIGURES

For a fuller understanding of the nature and objects of the present invention, reference should be made to the following detailed description taken in connection with the accompanying drawings in which the same reference numerals are used to indicate the same or similar parts wherein:

FIG. 1 shows a sectional view of a prior art capacitive pressure transducer.

FIG. 2 shows a prior art capacitive pressure sensor.

FIG. 4 shows a sectional view of a capacitive pressure transducer constructed according to the invention.

DETAILED DESCRIPTION OF THE PREFERRED EMBODIMENTS

Figure 3:
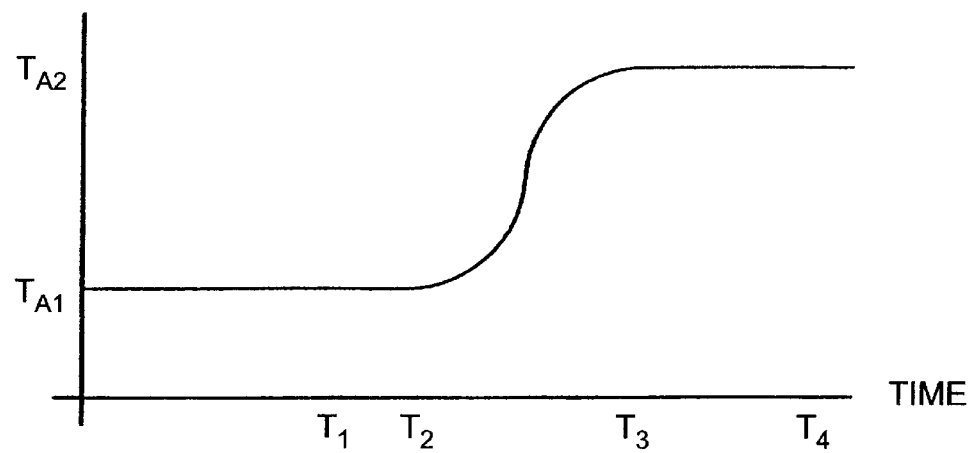
FIG. 3 shows a graph of ambient temperature versus time illustrating a prior art calibration procedure.

FIG. 4 shows a sectional view of an unheated capacitive pressure transducer 200 constructed according to the invention. As shown, transducer 200 is similar to transducer 100 (FIG. 1). In addition to temperature sensor $S_1$ on the I/O electronics assembly 180, transducer 200 further includes a second temperature sensor $S_2$. In operation, temperature sensor $S_2$ generates an output signal $T_{S2}$ representative of the temperature of sensor $S_2$. The sensor $S_2$ is preferably positioned so that it provides a measurement of the temperature of pressure sensor 140. As shown in FIG. 4, the temperature sensor $S_2$ is preferably located on the front end electronics assembly 160, however, it could also be physically located on pressure sensor 140. Temperature sensors $S_1$ and $S_2$ may be implemented using temperature sensitive diodes, thermistors, or the like.

Transducer 200 uses the temperature measurements provided by sensors $S_1$ and $S_2$ to provide improved thermal compensation. Preferably, the I/O electronics assembly 180 within transducer 200 generates the output signal for the transducer according to the following Equation (4).

$$O_T = O_U + f_1(T_{S1}) + f_2(T_{S1}, T_{S2}) \tag{4}$$

Equation (4) is similar to Equation (1), however, Equation (4) includes the additional term $f_2(T_{S1}, T_{S2})$. In Equation (4), the term $f_1(T_{S1})$ may be considered a "steady state" compensation term; and the term $f_2(T_{S1}, T_{S2})$ may be considered a "transient" compensation term. As with Equation (1), the term $O_U$ represents the uncompensated output signal and may be the output signal generated by front end electronics assembly 160 or may be an internal signal generated by I/O electronics assembly 180 (e.g., after amplification or linearization of the output signal generated by front end electronics assembly 160) and the term $f_1(T_{S1})$ is preferably calculated according to Equation (2). Whereas prior art transducers using Equation (1) provided steady state temperature compensation, they did not provide compensation for thermal transients (caused by rapid temperature changes in the ambient environment of the transducer). Unlike the prior art, in addition to providing steady state temperature compensation, transducer 200 also provides compensation for thermal transients.

The transient compensation term $f_2(T_{S1}, T_{S2})$ of Equation (4) is preferably calculated according to the following Equation (5).

$$f_2(T_{S1}, T_{S2}) = C_2[(T_{S2} - T_{S1}) - (T_{S2Ref} - T_{S1Ref})] \tag{5}$$

In Equation (5), $T_{S1}$ and $T_{S2}$ are the output signals generated by the temperature sensors $S_1$ and $S_2$, respectively; and the remaining terms, $C_2$, $T_{S1Ref}$, and $T_{S2Ref}$ are constant value parameters the values of which are determined according to a calibration procedure. Like the prior art calibration procedure used for computing parameters for steady state temperature compensation, in this calibration procedure, a reference pressure of zero, or vacuum, is applied to the inlet tube 144. The value of $T_{S1Ref}$ used in Equation (5) is the equal to the value of $T_{S1Ref}$ used in Equation (2) (i.e., $T_{S1Ref}$ equals the value of $T_{S1}$ for the ambient temperature at which $O_U$ equals zero volts when a vacuum is applied to the inlet tube 144). Similarly, the value of $T_{S2Ref}$ used in Equation (5) is equal to the value of the output signal $T_{S2}$ generated by temperature sensor $S_2$, at a time when the ambient temperature is such that the uncompensated output signal $O_U$ equals zero volts when a vacuum is applied to the inlet tube 144.

Figure 5:
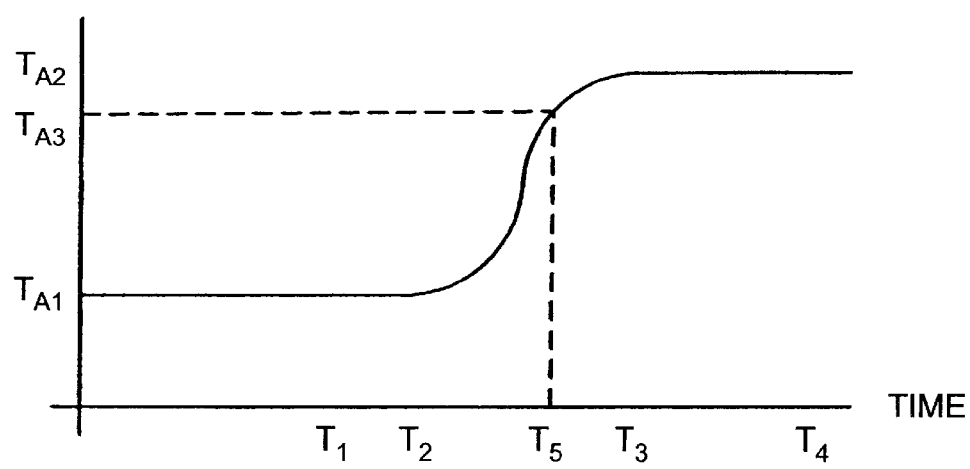
FIG. 5 shows a graph of ambient temperature versus time illustrating a calibration procedure according to the invention.

FIG. 5 illustrates the procedure used for determining the value of the constant $C_2$. The procedure is similar to what is illustrated in FIG. 3. However, an additional measurement of the uncompensated output signal $O_U$ is made at time $T_5$ while a vacuum reference pressure is applied to the inlet tube 144, where $T_5$ is between times $T_2$ and $T_3$ (i.e., $T_5$ is a time at which the temperature of the ambient environment of transducer 200 is changing). Using the measurements of $O_U$ made at times $T_1$, $T_4$, and $T_5$ the value of the constant $C_2$ is preferably calculated according to the following Equation (6).

$$C_2 = \frac{[(O_U(T_{A3}) + f_1(T_{A3})] - [(O_U(T_{A1}) + f_1(T_{A1})]}{[T_{S2}(T_{A3}) - (T_{S1}(T_{A3})] - [T_{S2}(T_{A1}) - T_{S1}(T_{A1})]} \tag{6}$$

In Equation (6), the term $T_{A3}$ represents the ambient temperature at time $T_5$ (as indicated in FIG. 5); the terms $O_U(T_{A3})$ and $O_U(T_{A1})$ represent the value of the uncompensated output signal at the ambient temperatures $T_{A3}$ and $T_{A1}$, respectively (or at times $T_5$ and $T_1$, respectively); the terms $f_1(T_{A3})$ and $f_1(T_{A1})$ represent the values of the steady state compensation term (as calculated according to Equation (2)) when the ambient temperature equals $T_{A3}$ and $T_{A1}$, respectively; the terms $T_{S1}(T_{A3})$ and $T_{S1(TA1)}$ represent the value of the output signal generated by sensor $S_1$ when the ambient temperature equals $T_{A3}$ and $T_{A1}$, respectively; and the terms $T_{S2}(T_{A3})$ and $T_{S2}(T_{A1})$ represent the value of the output signal generated by sensor $S_2$ when the ambient temperature equals $T_{A3}$ and $T_{A1}$, respectively. Although the function $f_1(\ )$, as shown in Equation (2), is a function of the output signal $T_{S2}$ generated by sensor $S_2$ rather than a function of the ambient temperature, it will be appreciated that the value of $f_1(T_{A3})$ and $f_1(T_{A1})$, as used in the above Equation (6) may be readily calculated by using the value of the output signal $T_{S2}$ generated when the ambient temperature equals $T_{A3}$ and $T_{A1}$, respectively. In other words, the notations $f_1(T_{A3})$ and $f_1(T_{A1})$ are shorthand for $f_1(T_{S1}(T_{A3}))$ and $f_1(T_{S1}(T_{A1}))$, respectively, which show more explicitly that the output signal $T_{S1}$ is a function of the ambient temperature.

As with the parameters used for steady state temperature compensation (i.e., $C_1$ and $T_{S1Ref}$), the additional parameters used by transducer 200 for providing transient temperature compensation (i.e., $C_2$ and $T_{S2Ref}$) are normally unique for every unit of transducer 200 and are preferably measured as part of the manufacturing process for transducer 200. Also, the temperature compensation parameters used by transducer 200 (i.e., $C_1$, $C_2$, $T_{S1Ref}$, and $T_{S2Ref}$) are preferably stored in digital memory (e.g., ROM) within transducer 200 (e.g., in the I/O electronics assembly 180). Also, I/O electronics assembly 180 preferably includes a digital processor for computing Equation (4) and generating a digital output representative of the transducer's output signal $O_T$. I/O electronics assembly 180 may further include a digital-to-analog converter for generating an analog output signal $O_T$. Alternatively, although less preferred, it will be appreciated that I/O electronics assembly 180 may generate an output signal $O_T$ according to Equation (4), without using digital processing, entirely by analog processing, or by a combination of analog and digital processing.

When the calibration procedure is being performed to determine the parameters $C_1$ and $C_2$, it will be appreciated that a wide range of values may be used for the ambient temperatures $T_{A1}$ and $T_{A2}$, for the measurement times $T_1$, $T_4$, and $T_5$, and for the times $T_2$ and $T_3$ between which heat is added to the ambient environment. Preferred values for calibrating at least one transducer of the type shown in FIG. 4 for $T_{A1}$ and $T_{A2}$ are 30 and 35 degrees Celsius, respectively. In this example, heat is preferably added to the ambient environment of the transducer being calibrated uniformly between times $T_2$ and $T_3$ so as to raise the ambient temperature from $T_{A1}$ to $T_{A2}$, and $T_2$ and $T_3$ are preferably separated by about forty five minutes. Also in this example, the time $T_5$ is preferably thirty minutes after $T_2$. In any case, $T_5$ is preferably selected to be a time at which the temperature of the ambient environment is rapidly changing.

The procedure described above in connection with Equations (4), (5), and (6) is a preferred method for providing compensation in a pressure transducer for thermal transients. However, it will be appreciated that the described method is a specific example of a general class of methods all of which are embraced within the invention. The more general class of methods will now be discussed. The following Equation (7) shows a more general form of the transient compensation term $f_2(\ )$ (the specific preferred form of which is shown in the above Equation (5)), where the notation "$f_2(\ )$" indicates that $f_2$ is a function of some variables.

$$f_2(\ )=\text{gain }[f_3(T_{Pressure\ Sensor}-T_{Ambient\ Environment})] \quad (7)$$

As shown in Equation (7), the transient compensation term $f_2(\ )$ is preferably a function of the difference between the temperature of the pressure sensor 140 and the temperature of the ambient environment of the transducer. As discussed above, the output signal $T_{S2}$ generated by the sensor $S_2$ may be used to.provide a measure of the temperature of the pressure sensor $T_{Pressure\ Sensor}$, and the output signal $T_{S1}$ generated by the sensor $S_1$ may be used to provide a measure of the temperature of the ambient environment $T_{Ambient\ Environment}$. However, it will be appreciated that other methods or components may be used to measure the temperature of the ambient environment and the pressure sensor, and those measurements may be substituted generally for the quantities $T_{S1}$ and $T_{S2}$ in the temperature compensation methods described throughout this specification. The function $f_3(T_{Pressure\ Sensor}-T_{Ambient\ Environment})$ (as shown in Equation (7)) is preferably selected so that (a) it is zero valued when transducer 200 is operating in a steady state (i.e., when the ambient temperature has been at a constant value sufficiently long for transducer 200 to reach a steady state of operation, or a state in which the uncompensated output signal $O_U$ has reached a constant unchanging value) and (b) it has a non-zero value when transducer 200 is not operating in a steady state. One preferred simple form for the function $f_3(\ )$ is shown in the following Equation (8).

$$f_3(T_{S2}-T_{S1})=T_{S2}-T_{S1}+\text{offset} \quad (8)$$

In Equation (8), the term 'offset' is preferably a constant value representative of the steady state temperature difference between the pressure sensor 140 and the temperature of the ambient environment of transducer 200. Comparing Equations (5) and (8), it can be seen that one way to compute a value for 'offset' is to set it equal to the quantity $T_{S2Ref}$ minus $T_{S1Ref}$. However, it will be appreciated that whereas the quantity $T_{S2Ref}$ minus $T_{S1Ref}$ represents the temperature difference between pressure sensor 140 and the ambient environment as measured by a specific calibration procedure, other methods may be used to measure this temperature difference as well. The function $f_3(\ )$ as computed by Equation (8) will be zero valued whenever transducer 200 is in a steady state because the quantity $T_{S2}$ minus $T_{S1}$ will equal the value of "offset". However, when the temperature of the ambient environment of transducer 200 is rapidly changing, the quantity $T_{S2}$ minus $T_{S1}$ will differ from the value of "offset" and the function $f_3(\ )$ as computed by Equation (8) will have a non-zero value.

The 'gain' term of Equation (7), which is analogous to the $C_2$ term of Equation (5), preferably has the general form shown in the following Equation (9).

$$gain = \frac{\Delta O_U}{\Delta [f_3(\ )]} \quad (9)$$

In Equation (9), the terms $\Delta O_U$ and $\Delta[f_3(\ )]$ represent the change in the uncompensated output signal and the change in the function $f_3(\ )$, respectively, observed during a transient temperature change of the ambient environment of transducer 200. In Equation (9), the particular form of the function $f_3(\ )$ that is used is preferably the same form for that function as it is used in the above Equation (7). As an alternative to Equation (9), rather than using the change in the uncompensated output signal $\Delta O_U$, the "gain" may be calculated using the change in the uncompensated output signal as that signal is compensated for steady state temperature variations as shown in the following Equation (10).

$$gain = \frac{\Delta [O_U + f_1(\ )]}{\Delta [f_3(\ )]} \quad (10)$$

In the above Equation (10), the term $f_1(\ )$ represents a steady state temperature compensation term and may be calculated for example as described above in connection with Equation (2) or by other method known in the art. So, in Equation (10), the term $\Delta[O_U + f_1(\ )]$ represents a change in the steady state compensated output signal observed during a transient temperature change of the ambient environment of transducer 200.

Figure 6:
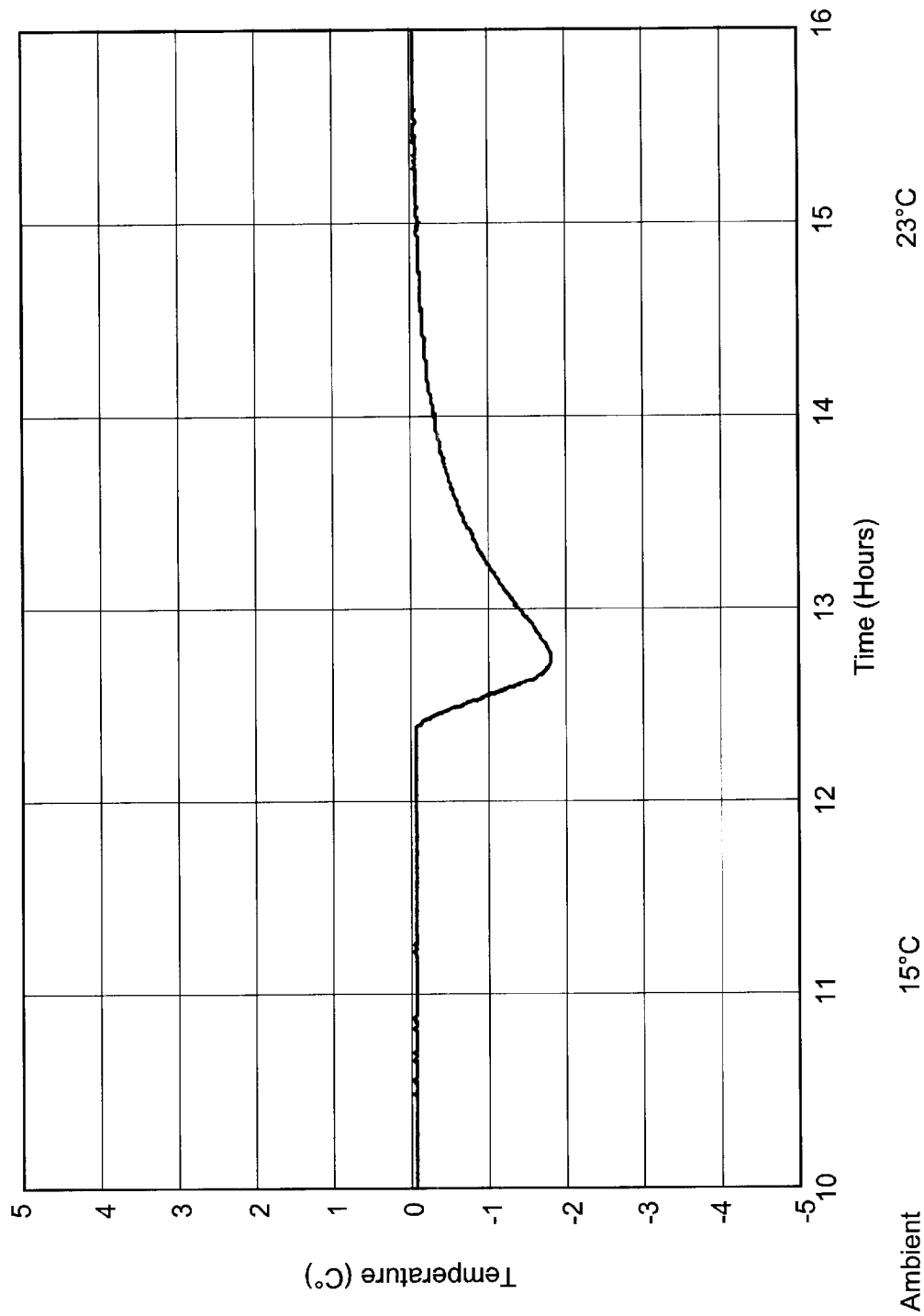
FIG. 6 shows a graph of temperature versus time illustrating a function useful for providing transient temperature compensation according to the invention.

Several drawings will now be discussed that graphically illustrate operation of the invention. FIG. 6 shows a graph of the function $f_3(\ )$ as calculated according to the above Equation (8), where "offset" is equal to 2.5 degrees Celsius, for a particular transducer. As shown, the transducer is operated at an ambient temperature of fifteen degrees Celsius for about twelve hours and for the bulk of that time, the function $f_3(\ )$ is zero valued. Then, at time equal to about twelve and a half hours, the ambient temperature of the transducer is heated up to twenty three degrees Celsius (the ambient temperature reaches twenty three degrees Celsius at about time equal to twelve and three quarters (12.75) hours). As shown, in response to this change in ambient temperature, the function $f_3(\ )$ is non-zero valued from time equal to about twelve and a half hours to about fifteen hours. Thereafter, the function $f_3(\ )$ is again zero valued.

Figure 7:
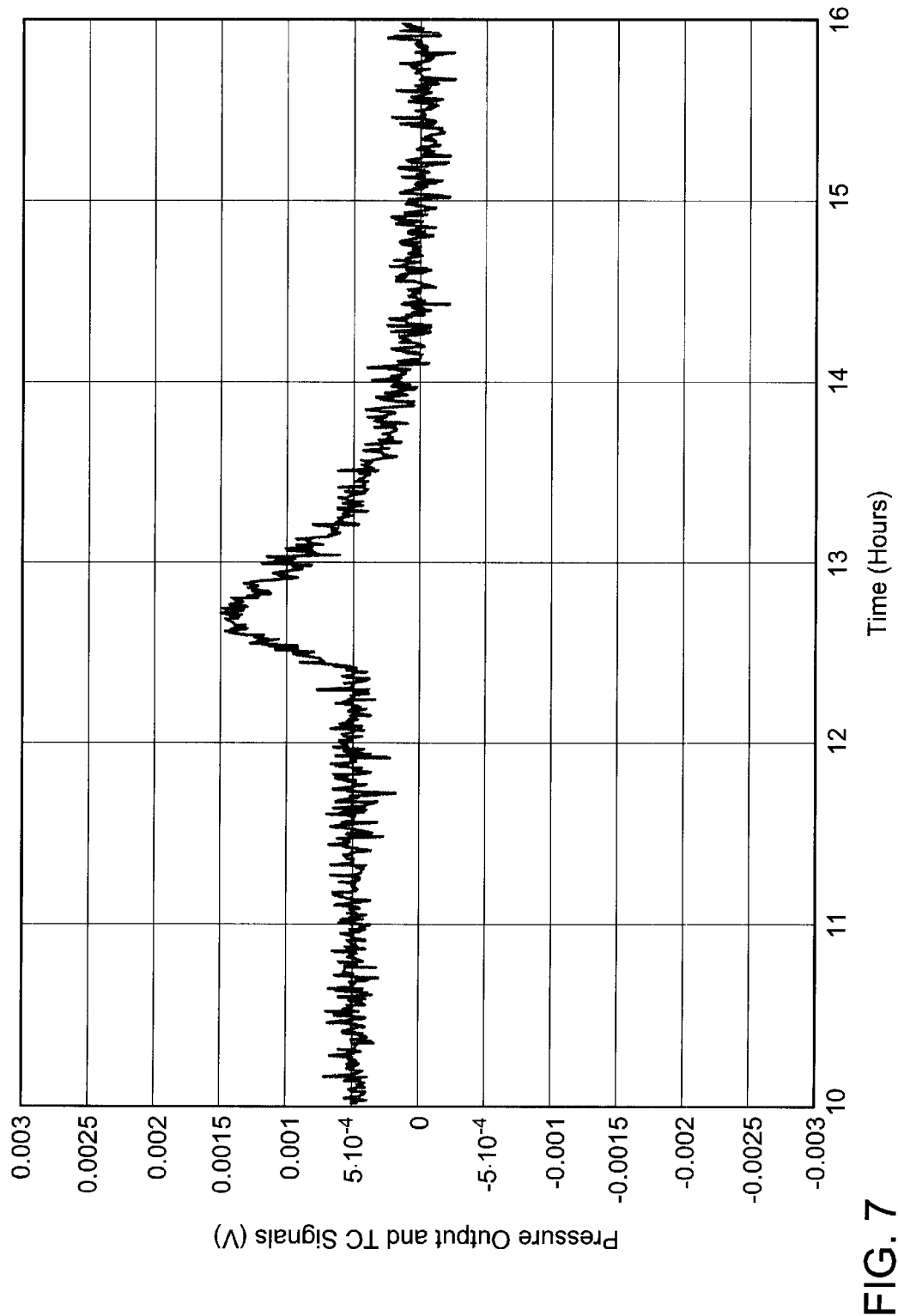
FIG. 7 shows a graph of voltage versus time for an output signal of a pressure transducer when the ambient environment of the transducer experiences a transient temperature change and when the output signal is not compensated for transient temperature changes.

FIG. 7 shows a graph of the steady state compensated output signal (i.e., $O_U$ plus $f_1(\ )$) of the transducer during the same time period in which the ambient temperature changes shown in FIG. 6 occur. Although the pressure in the transducer's inlet tube remains constant during the entire period illustrated in FIG. 7, the uncompensated output signal experiences a transient variation in response to the change in ambient temperature. As shown, the transient in the steady state compensated output signal has a shape that is generally similar to the function shown in FIG. 6.

Figure 8:
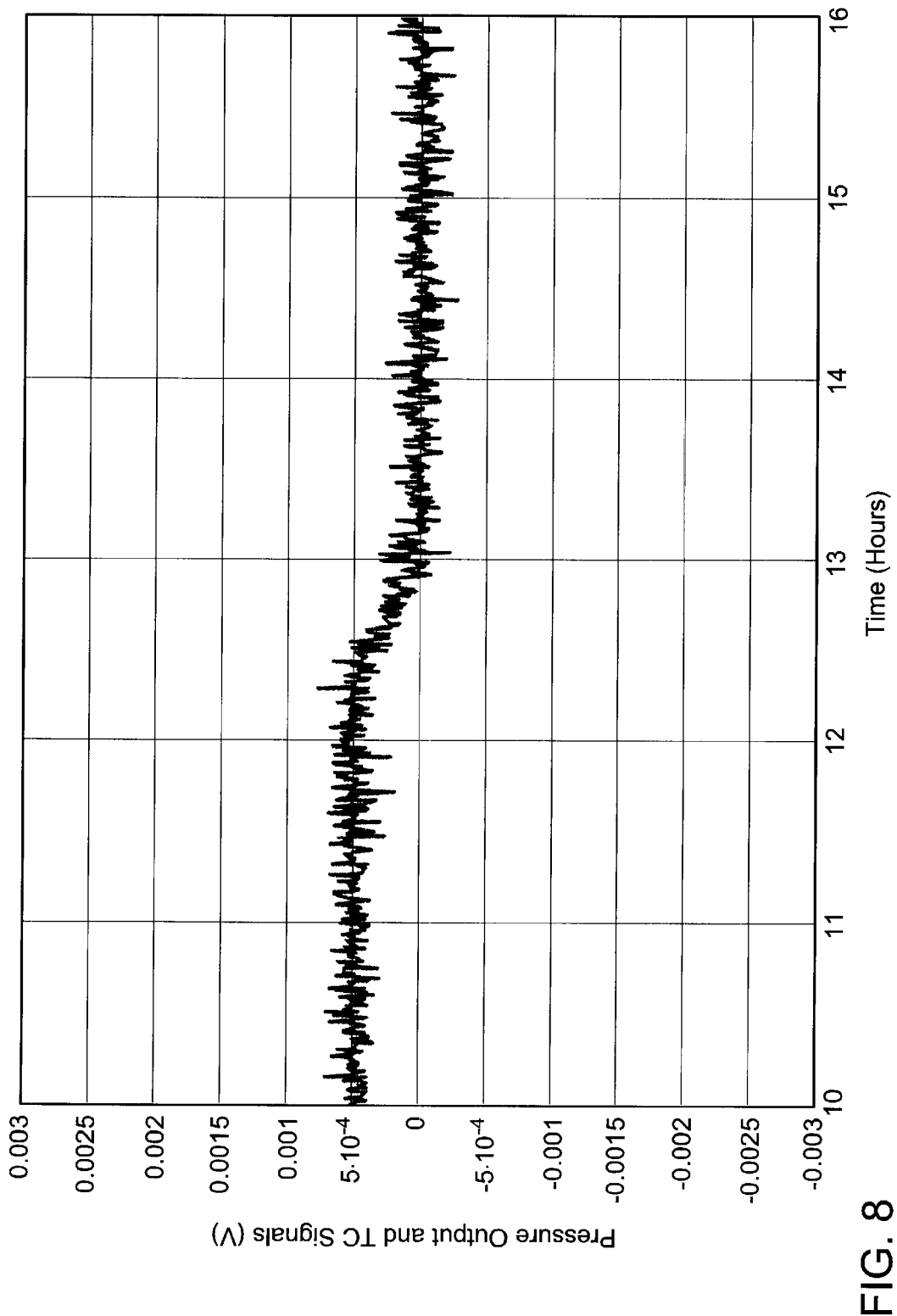
FIG. 8 shows a graph of voltage versus time for an output signal of a pressure transducer during the same times shown in FIG. 7 when the output signal is compensated for transient temperature changes according to the invention.

FIG. 8 shows a graph of the transient compensated output signal $O_T$ of the transducer, generated according to the above Equations (4–6), for the transducer during the same time periods shown in FIGS. 6 and 7. As shown in FIG. 7, if transient temperature compensation is not provided, the transducer takes over an hour and a half to reach a steady state after the transient temperature change in the ambient environment. However, as shown in FIG. 8, if transient temperature compensation is provided according to the invention, then the transducer takes about only half an hour to reach a steady state after the transient temperature change in the ambient environment. Accordingly, transient temperature compensation provided according to the invention advantageously reduces the time required for the pressure output signal of a transducer to reach a steady state following a transient temperature change in the ambient environment.

Since certain changes may be made in the above apparatus without departing from the scope of the invention herein involved, it is intended that all matter contained in the above description or shown in the accompanying drawing shall be interpreted in an illustrative and not a limiting sense. For example, the transducers discussed above all include two separate electronics assemblies, front end electronics assembly 160 and I/O electronics assembly 180. However, it will be appreciated that the transient temperature compensation of the invention may be provided in a wide variety of transducers, including for example transducers that include only a single electronics assembly. In such configurations, it is preferable to mount the electronics assembly near the pressure sensor, to keep heat generated by the electronics assembly to a minimum and/or to transfer heat generated by the electronics assembly to the transducer's housing. Similarly, the transducer need not include a joiner 116 and the pressure sensor 140 can be mounted within a variety of housings. Transient temperature compensation according to the invention may be provided as long as temperature measurements are available that are representative of, or are functions of, the temperatures of the pressure sensor and the ambient environment. Also, while it is advantageous to provide both steady state and transient temperature compensation (as has been described above), it will be appreciated that the transient temperature compensation of the invention may also be provided in transducers that do not provide steady state temperature compensation. In this regard, an internal signal generated within the transducer prior to providing the transient temperature compensation (e.g., prior to adding an $f_2(\ )$ transient compensation term), may be regarded as the "uncompensated signal" regardless of whether or not steady state compensation has already been provided (e.g., an "uncompensated signal" could include $O_U + f_1(\ )$ (as in Equation (1)) or could simply include the term $O_U$). Also, when steady state temperature compensation is provided, it may be provided according to Equations (1–3) or by any other known methods. Also, although Equation (2) shows the steady state compensation term $f_1(\ )$ being calculated using measurements from the first temperature sensor $S_1$, the steady state compensation term could alternatively be calculated using measurements from the second temperature sensor $S_2$ [e.g., $f_1(\ ) = C_1(T_{S2} - T_{S2Ref})$].

What is claimed is:

1. A method of providing temperature compensation in a pressure transducer, comprising:
   (A) providing a pressure transducer, the transducer including:
     (a) a capacitive pressure sensor, the pressure sensor including a diaphragm, at least part of the diaphragm moving in response to changes in a pressure;
     (b) an electronic circuit, the circuit generating an uncompensated output signal representative of the pressure;
   (B) generating a first output signal representative of a temperature of an ambient environment;
   (C) generating a second output signal representative of a temperature of the pressure sensor;
   (D) generating a temperature compensated output signal according to a first function of the uncompensated output signal, and a difference between the first and second output signals.

2. A method according to claim 1, further comprising generating the compensated output signal by summing the uncompensated output signal with a second function of the difference between the first and second output signals.

3. A method according to claim 2, wherein the second function of the difference between the first and second output signals comprises a product of a constant value and a third function of the difference between the first and second output signals.

4. A method according to claim 3, wherein the third function comprises the second output signal minus the first output signal plus an offset value.

5. A method according to claim 3, wherein the constant value is a quotient of a first number and a second number, the first number representing a change in the uncompensated signal measured during a period when the temperature of the ambient environment is changing, the second number representing a change in the third function measured during the period.

6. A method of providing temperature compensation in a pressure transducer, comprising:
   (A) providing a pressure transducer, the transducer including:
     (a) a capacitive pressure sensor, the pressure sensor including a diaphragm, at least part of the diaphragm moving in response to changes in a pressure;

(b) an electronic circuit, the circuit generating an uncompensated output signal representative of the pressure;

(B) generating a compensated output signal by summing the uncompensated output signal and a transient temperature compensation term, the transient temperature compensation term being a function of a temperature of the pressure sensor and of the temperature of an ambient environment.

7. A method according to claim 6, the transient temperature compensation term being a product of a first term and a second term, the first term being a gain, the second term being a function of a difference between the temperature of the pressure sensor and of the temperature of the ambient environment.

8. A method according to claim 7, wherein the function of the difference between the temperature of the pressure sensor and of the temperature of the ambient environment comprises the temperature of the pressure sensor minus the temperature of the ambient environment plus an offset.

9. A method according to claim 7, wherein the function of the difference between the temperature of the pressure sensor and of the temperature of the ambient environment comprises subtracting a signal representative of the temperature of the ambient environment from a signal representative of the temperature of the pressure sensor and adding an offset.

* * * * *